Oct. 28, 1941.  H. J. LAFAYE, SR  2,260,676
BOAT TRAILER
Filed June 7, 1940  4 Sheets-Sheet 1
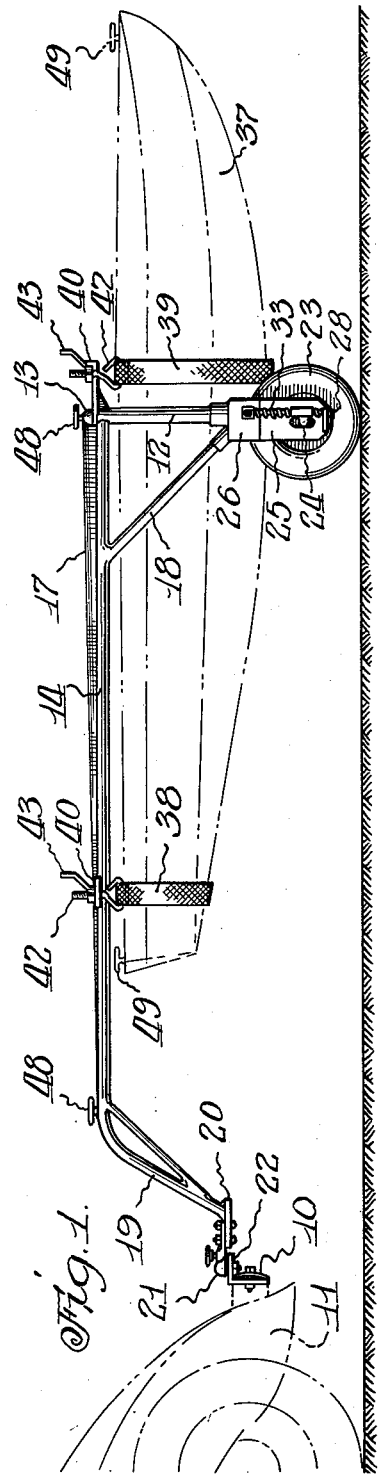
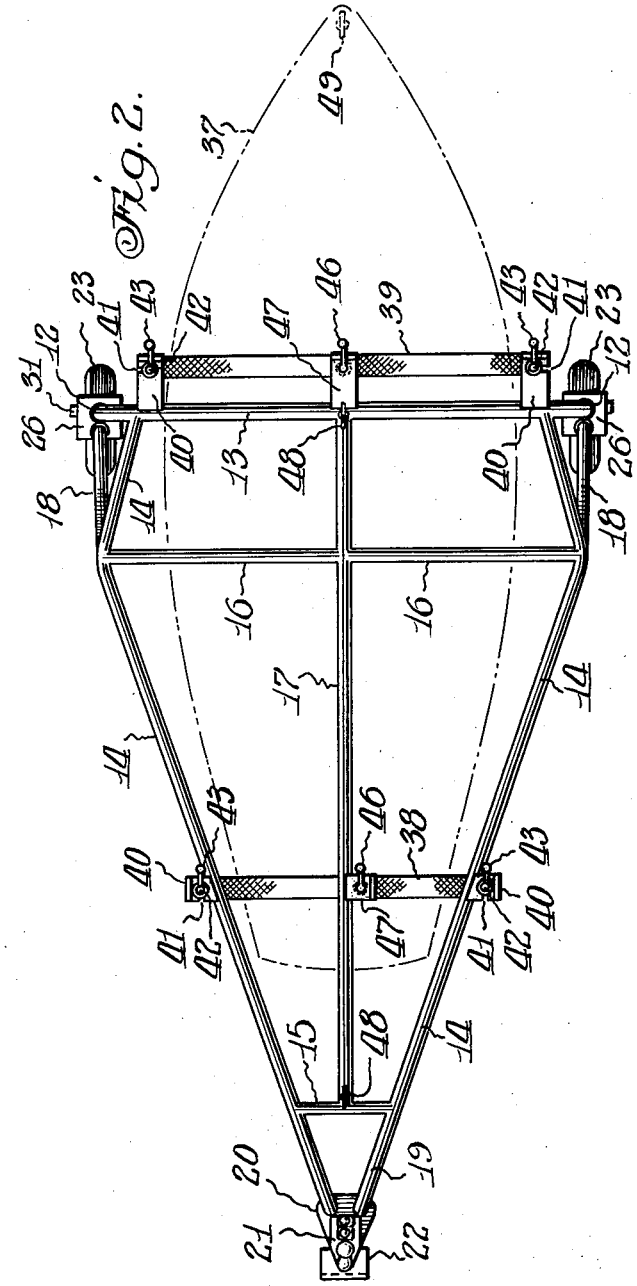
Inventor
Hilton J. Lafaye Sr.
by Eichelman
Attorney.

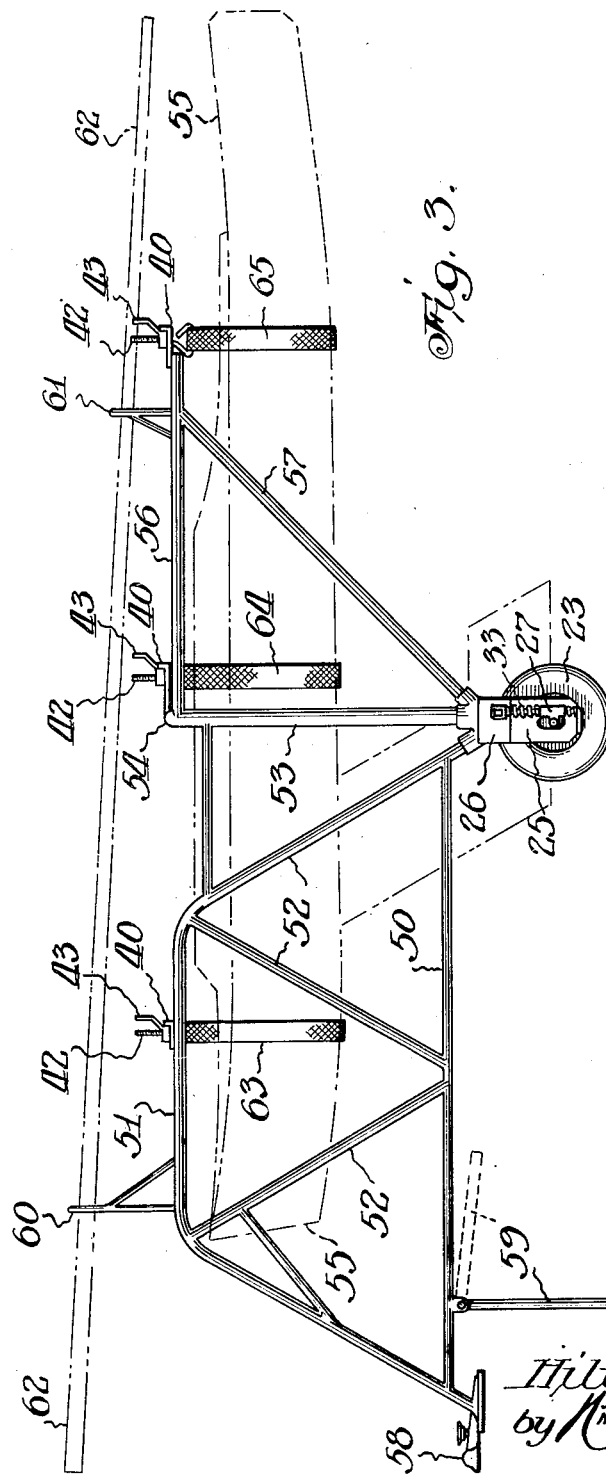
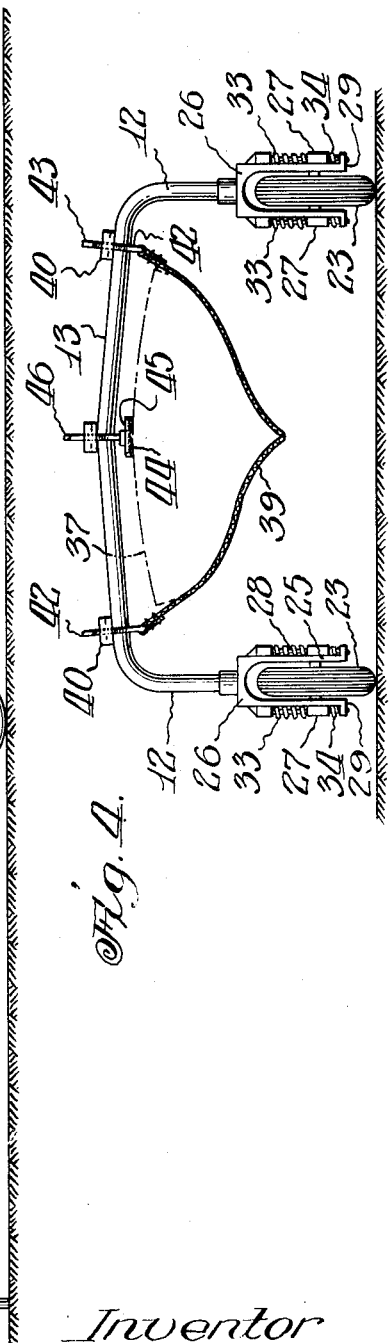

Oct. 28, 1941.   H. J. LAFAYE, SR   2,260,676
BOAT TRAILER
Filed June 7, 1940   4 Sheets-Sheet 3
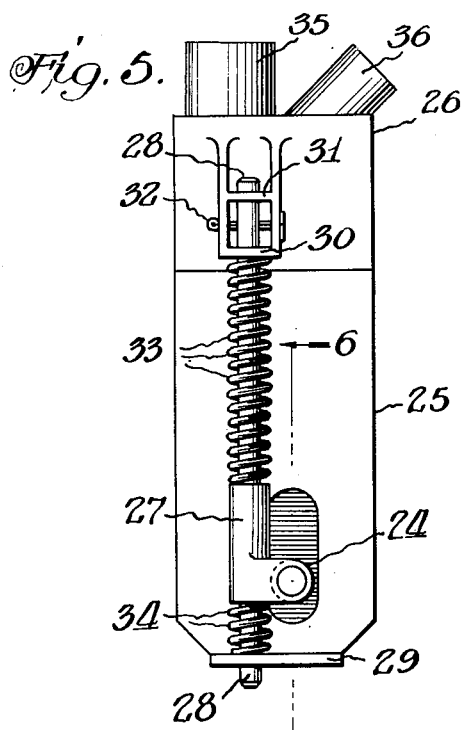
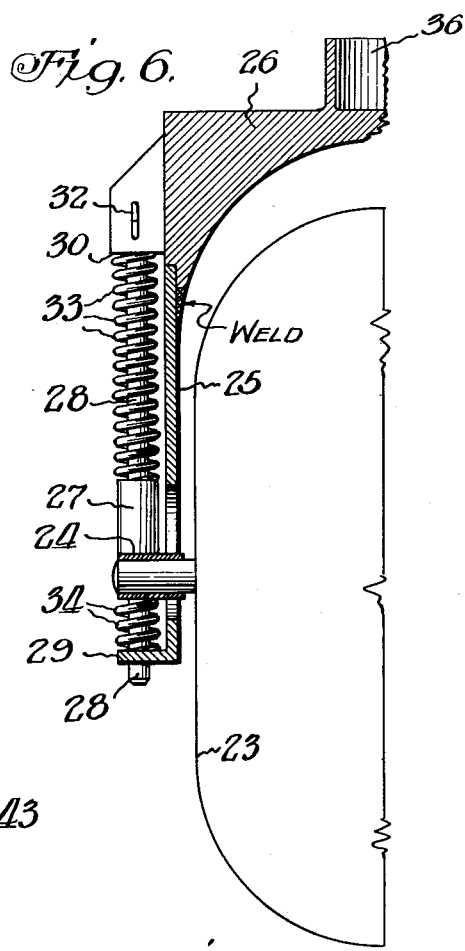
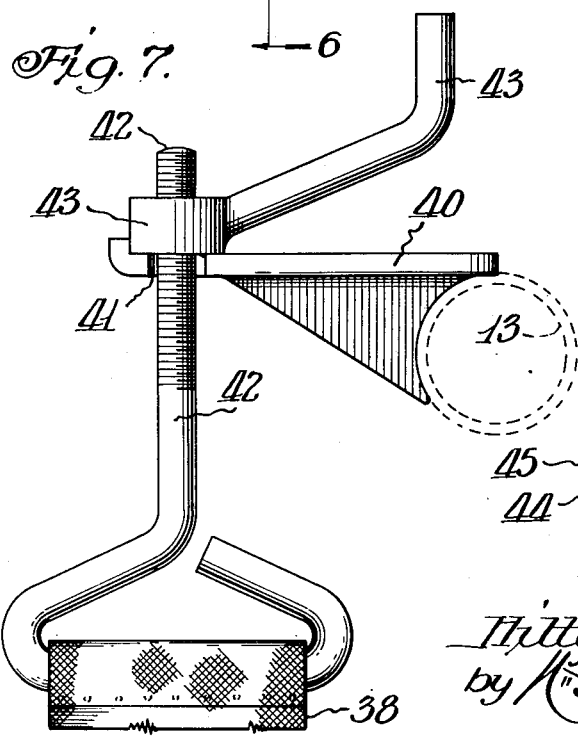
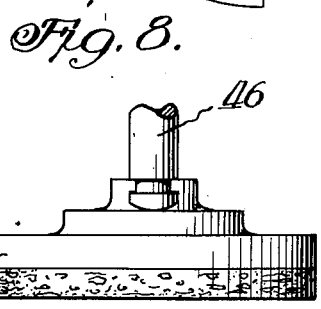
Inventor
Hilton J. Lafaye Sr.,
by
Attorney.

Oct. 28, 1941.  H. J. LAFAYE, SR  2,260,676
BOAT TRAILER
Filed June 7, 1940   4 Sheets-Sheet 4

Inventor
Hilton J. Lafaye, Sr.,
by Eichelman
Attorney.

Patented Oct. 28, 1941

2,260,676

UNITED STATES PATENT OFFICE 2,260,676

BOAT TRAILER

Hilton J. Lafaye, Sr., Akron, Ohio, assignor to Charles R. Jahn, Chicago, Ill.

Application June 7, 1940, Serial No. 339,276

5 Claims. (Cl. 214—75)

My invention relates to a boat trailer in the form of a two-wheeled vehicle whereby one man may move or roll the trailer into the water, pick up his boat, secure the trailer to the rear of a draft vehicle, and haul the boat away or transport the boat overland from place to place at relatively high speeds; and particularly to a trailer design which provides for the suspension of the boat in pendulant slings hanging from a relatively stiff rigid structure, light in weight to permit complete maneuverability both in and out of the water, and whereby the load or boat is underslung, that is, completely suspended, as compared to the usual method of supporting or upholding the load or boat upon a frame or chassis, thus providing for an unusually low center of gravity which assures perfect safety, and ease of control without the attendant possibility of weaving or tipping even on curves when taken at high speeds.

And more particularly, my invention has for its objects, the provision of a two-wheeled trailer extremely light in construction, but relatively rigid and of ample structural strength to effectively accommodate a range of boat sizes coming within the designed load limits or capacity of the trailer; and The manufacture and sale of a trailer at a substantially lower price than other trailers of a like capacity as heretofore known or sold; and The resilient suspension of the boat in flexible cradles or slings, giving perfect balance and whereby any vibration incident to travel will be most effectively absorbed, thus saving the boat from damage and overcoming the usual rattle and rumble which is so objectionable to the driver or occupants of the motor vehicle drawing the trailer; and The provision of means for adjustably securing the cradles or slings to the frame of the trailer in such a manner that the boat may be quickly and easily lifted from the water and fastened firmly to the frame of the trailer and subsequently released when the boat is placed in the water without the necessity of the operator entering the water at any time during the loading or unloading of the trailer; and The incorporation of pneumatic tired wheels, spring supported in bearings carried by the frame of the trailer to assist in absorbing road shock and vibration; and The inclusion, as a part of the trailer frame, of demountable spar supports, adapted to carry the spars or like paraphernalia of a sail boat in a manner so as not to interfere with, impede or restrict the movements of the trailer or the motor vehicle drawing the trailer, confined, compact, and without danger to others when in route.

My present invention has these and other objects, all of which are explained in detail and may be more readily understood when read in conjunction with the accompanying drawings (four sheets) which illustrate a preferred embodiment of my invention, it being manifest that changes and modifications may be resorted to without departure from the spirit of the claims forming a part hereof. And whereas I have so described my invention, it is to be understood that the words I use are words of description and not of limitation. Similar reference characters refer to similar parts throughout the several views of the drawings, and wherein:

Fig. 1 is an elevational view of the trailer shown attached to the rear bumper of a tow car and carrying a boat, the boat and car are illustrated in broken lines as they form no part of my invention;

Fig. 2 is a plan view of Fig. 1 with the car omitted and likewise showing the boat in broken lines;

Fig. 3 is an elevation of a modified form of trailer which I employ when the class of boat to be transported is of greater depth or when provided with an integral keel and rigging;

Fig. 4 is an end view of Fig. 1;

Fig. 5 is an enlarged detail of the fork or wheel mounting;

Fig. 6 is a fragmentary section thru Fig. 5 on line 6—6;

Fig. 7 is an enlarged detail of the sling clamp and supporting bracket;

Fig. 8 is a fragmentary detail of the bottom portion of the jack or wedge member;

Figure 9:
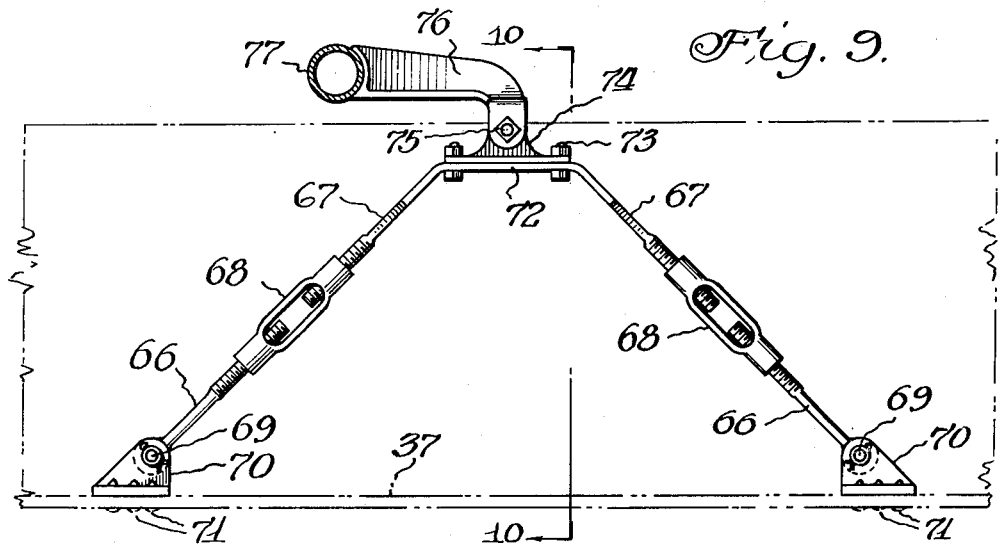
Fig. 9 is a fragmentary detail in elevation illustrating a modified form of sling, and a portion of the boat as before is shown in broken lines.

The structure illustrated involves the specific application of one form of my invention employed in the building of a boat trailer, which, in general, comprises a wheeled chassis adapted to be pivotally secured to the rear bumper 10 of a motor vehicle 11, which is adapted to serve as draft means for transporting the trailer overland.

The trailer chassis, which I preferably construct of tubular members such as pipe or steel tubing, comprises a relatively rigid, inverted U-shaped saddle portion having spaced-apart depending legs 12, cross-connected at their tops with a horizontal bar or bridge 13 which is preferably slightly bowed upwardly at the center (see Fig. 4), and a pair of integrally formed converging shafts 14—14, forming a horizontally disposed A-frame with cross-braces 15 and 16 and a center brace 17. The rear ends of the A-frame are bent inwardly at an angle and rigidly affixed, preferably by means of welding, to the bridge member 13. Knee braces 18 connect the under-side of the frame members 14, with the vertical legs 12, and the forward or converging ends of the frame members 14—14 are bent downwardly at 19 and have their ends welded to a plate 20 which is in line with the bumper 10 of the vehicle 11. The plate 20 carries one member 21, of the usual ball and socket bumper joint while the bumper carries the other related member 22 of the joint.

The above described chassis is carried upon a pair of wheels 23—23 which are journaled in bearings 24 (see Figs. 5 and 6) mounted on the side plates 25 of a bifurcated or forked support 26 to which the leg portions 12 and knee braces 18 are welded as shown. The details of this particular wheel mounting comprise a steel casting forming the major portion of the support 26, with a steel plate 25 welded on each side thereof and adapted to extend downwardly beyond the bearing for the wheel. This wheel bearing 24 passes thru and rides in a slot in the plate 25, and has a vertical leg or extension 27 bored out to slide upon a vertical rod 28 which in turn is held in position as it passes thru an opening in the bottom outwardly extending flange 29 of the side plate 25, and passes thru the top and bottom walls 30—31 of a box-shaped support which is integral with the top casting 26, where it is pinned in place by means of the cotter pin 32. A coiled spring 33 is carried by the rod 28 between the top of the bearing extension 27 and the underside of the bracket wall 30, and a similar, but shorter spring 34 is likewise interposed between the bottom of the bearing extension 27 and the top of the flange 29. This arrangement provides for a floating suspension of the wheel, as the major portion of the load is carried upon the springs 33—33, while the springs 34—34 serve as snubbers or shock absorbers. And to facilitate fabrication, I prefer to cast the tubular hubs 35 and 36 as an integral part of the major casting 26, so that the tubular members comprising the legs 12 and knee braces 18 can readily be fitted thereto and welded in place without unnecessary adjustment and fitting.

I find that in building up the above described chassis, it is most desirable to employ a light weight steel tubing, hollow shaft, or pipe, and welding connections give me a most efficient, rigid, strong and durable construction, light in weight, easy to handle and inexpensive to make.

From this chassis I now suspend the boat 37, that is, in place of supporting the boat upon a trailer, or carrying the boat between shafts as has heretofore been the usual practice, I now carry the entire weight of the boat upon a pair of spaced-apart pendulant slings 38 and 39, which are preferably made from a heavy pliable fabric so that they may be passed under the boat and readily conform to the contour of the bottom portion of the boat. Each end of each sling is both removably and adjustably secured to the chassis by means of a bracket 40 (see Fig. 7) which is preferably welded rigid with the chassis and which is slotted at 41 to receive the threaded shank of the bolt 42, the lower portion whereof is formed into an eye to receive the end of the fabric sling 38 as shown. A wing nut 43 is adapted to engage the threaded end of the bolt 42 on the top side of the bracket, whereby the adjustment of the nut 43 will either lengthen or shorten the effective length of the sling, and by means of the slot 41, the entire assembly, when loosened, may be removed from the bracket without the complete removal of the wing nut from its assembly with the bolt. The positioning of the slings upon the trailer frame is usually governed by the size and weight of the boat to obtain the best balance, and as in the case of the assembly shown by Figs. 1 and 2, the sling 38 is preferably located forward of the saddle portion of the chassis while the sling 39 is located rearwardly thereof.

At one or more points between the top portion or deck of the boat 37 and the underside of the A-frame of the chassis, I interpose a resilient pad or cushion preferably of sponge rubber, cork, or felt, so that as the boat is drawn upwardly to engagement with the chassis, the resilient blocks will cushion the top portion of the boat against the chassis and thereby provide for a tight and fast securement of the boat to the underside of the chassis. These resilient blocks, for purpose of illustration, are shown (Fig. 8) as comprising a pad of sponge rubber or felt 44, affixed to the underside of a metallic disc 45. A bolt 46 is adapted to have threaded engagement with a bracket 47, similar to the sling brackets just above described, and bearing against the top of the disc 45 so that the bolt, when rotated, will force the pad downwardly against the deck of the boat and thus augment the slings in securing the boat resiliently to the chassis. Cleats 48 may be secured to portions of the chassis, similar to the cleats 49 usually positioned fore and aft of a boat, and by means of which the boat may be further lashed to the chassis should occasion arise (for better illustration, the rope or lashing has been omitted from the drawings).

When it is desirable to transport the class of boats having integral keels, or where the trailer chassis of necessity must be heightened over and beyond that just above shown and described, I contemplate the building of the side members of the A-frame in the form of open trusses such as shown at Fig. 3 of the drawings, and wherein the frame has both top and bottom cords 50 and 51, and cross braces 52, and wherein the saddle portion has extended legs 53 and a bridge 54 as before. And where the boat 55 is of a greater length as shown, I propose to extend a top frame member 56, rearwardly from the saddle portion and reinforce it with a knee brace 57. The forward end of the chassis is likewise provided with one member of the usual ball and socket joint 58 for pivotal attachment to the draft vehicle (not shown), and as this type of trailer carries considerable weight, I find it expedient to pivotally attach a leg or support 59 to the forward end or bottom chord of the frame 50 which may be swung out of the way once the trailer is coupled to the draft vehicle. Brackets 60 and 61 are mounted both fore and aft of the frame respectively, and are adapted to carry the mast or spars 62 in a convenient manner and so as not to interfere with the movements of the trailer.

As before, the boat 55 is here suspended from the chassis by means of the pendulant slings 63, 64 and 65, similar in all respects to those previously described except that I prefer to use three slings instead of only two, as before. The cushioning means and wheel suspension are also adapted to be employed as described, for the same purpose and of like effect as before.

Figure 10:
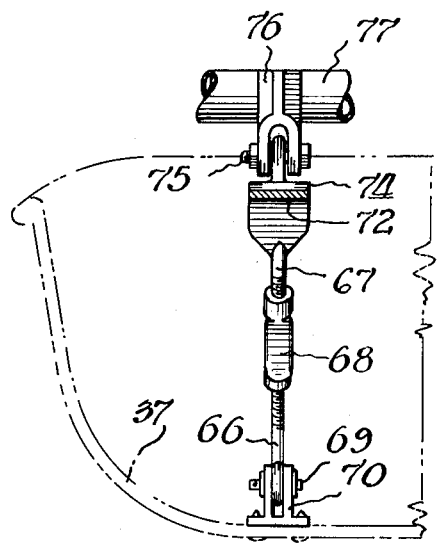
Fig. 10 is a vertical section taken on line 10—10 of Fig. 9.
Figure 11:
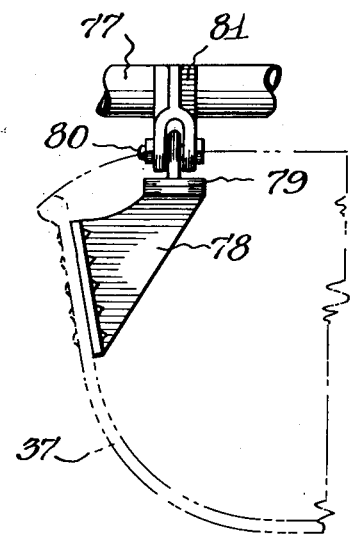
Fig. 11 is a like view of a further modification of supporting bracket shown in its relative position to the boat.

Oftentimes it is found desirable to employ slings which are relatively fixed in their positions and with their attachments become a part of the boat, for example, as where the boats are in every day use such as those employed by the Coast Guard and the usual life guard service. In this case, I may adopt the form of sling shown at Figs. 9 to 11 and wherein the the boat is suspended by metallic slings comprising the threaded rods 66 and 67 which are connected at their adjoining ends by a turnbuckle 68, for adjustment in length and for drawing the boat 37 upwardly into engagement with the cushions 44 as before described. The lower rods 66 are pivoted at 69 to a bracket 70 which is preferably (but not necessarily) rigidly and permanently secured to the bottom of the boat such as by rivets 71 or other effective means. The tops of the rods 67 are terminated in a common platform 72 to which is secured by bolts 73, or otherwise, a bearing block 74, which in turn is pivoted by the pin 75 to the forward end of a bifurcated bracket 76, the opposite end whereof is welded rigid with the cross-frame member 77, which corresponds to the bridge 13 as shown at Fig. 4 of the drawings.

The boat may be disconnected from the trailer by removing the pin 75 from each sling, or by removing the pins 69 from the lower ends of the rods 66, or both, as this is optional with the operator.

Where slings are employed both fore and aft, as illustrated at Fig. 1, I also find it convenient to substitute a pair of rigid brackets 78 (see Fig. 11) positioned one on each side of the boat directly adjacent the bridge 77, for one of the slings as first described. The brackets 78 are connected to the bridge 77 by means of a bearing block 79, removable pin 80, and bifurcated bracket 81, similar to those just above described.

I am aware that in the past, many designs and types of boat trailers have been employed for supporting and transporting a boat over land. I therefore do not claim the broad idea of a two-wheeled trailer, but what I do claim and desire to secure by Letters Patent is:

1. In a trailer for transporting a boat or the like, a wheeled chassis having a non-resilient bridging member rigidly affixed thereto and arranged to straddle and overhang a portion of the boat, and means for suspending the boat from the chassis and resiliently attaching the boat to said bridging member, said means comprising a cushioning member interposed between the boat and said bridging member, and a pair of spaced-apart pendulant slings adapted each to partially encircle a portion of the bottom portion of the boat and having at least one of their upper portions adjustably secured to the chassis and whereby the boat is adapted to be drawn upwardly and yieldingly affixed to said non-resilient and rigidly affixed bridging member.

2. A trailer for transporting a boat or the like comprising a wheeled chassis having a transversely disposed substantially inverted U-shaped bridging portion rigidly secured thereto and arranged to straddle a portion of the boat, a longitudinally disposed portion rigid with said bridging portion arranged to overhang a portion of the top of the boat and to connect with draft means for transporting said trailer over-land, and means for suspending the boat from the chassis and resiliently and removably attaching the boat thereto, said means comprising a cushioning member interposed between said rigid bridging portion and said boat, and a pendulant sling adjustably secured to the longitudinally disposed portion of said chassis, and a like sling adjustably secured to the rigid bridging portion of said chassis, each of said slings being adapted to encircle and support a portion of the bottom part of said boat.

3. A boat trailer as per claim 2, wherein a resilient cushion is arranged between the uppermost top portion of said boat and the underside of said chassis at all points where said boat has bearing upon said chassis.

4. A boat trailer as per claim 1, wherein the chassis is partially supported upon wheels secured thereto, a wheel support consisting of a wheel housing rigid with said chassis, a wheel bearing member arranged upon said housing to carry a wheel, said bearing member being slidably movable with relation to said rigid housing, and resilient cushioning members arranged both above and below said bearing member respectively.

5. In a trailer for transporting a boat or the like, a wheeled chassis having a rigid portion thereof adapted to straddle a portion of the boat, and a second portion of said chassis rigid with said first portion adapted to overhang another portion of the boat, said overhanging portion of said chassis comprising a pair of converging members, the spaced-apart ends thereof being rigidly secured to said straddling portion, and wherein the opposite ends of said converging members are connected together and as a unit adapted to be pivotally connected to draft means for transporting said trailer over-land, means for suspending the boat from the chassis and resiliently and removably attaching the boat thereto, and wherein the major portions of said chassis are comprised of tubular members rigidly secured together, braced and reinforced to impart a truss action thereto adequate to support the entire weight of the boat in tension.

HILTON J. LAFAYE, Sr.